(12) United States Patent
Xie

(10) Patent No.: US 8,641,850 B2
(45) Date of Patent: *Feb. 4, 2014

(54) POLYMER SYSTEMS WITH MULTIPLE SHAPE MEMORY EFFECT

(75) Inventor: Tao Xie, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 651 days.

This patent is subject to a terminal disclaimer.

(21) Appl. No.: 12/396,045

(22) Filed: Mar. 2, 2009

(65) Prior Publication Data

US 2010/0028686 A1 Feb. 4, 2010

Related U.S. Application Data

(63) Continuation-in-part of application No. 12/181,562, filed on Jul. 29, 2008.

(51) Int. Cl.
*B32B 27/38* (2006.01)
*B32B 37/00* (2006.01)

(52) U.S. Cl.
USPC ............................................ 156/242; 156/60

(58) Field of Classification Search
USPC ............................................................ 156/60
See application file for complete search history.

(56) References Cited

U.S. PATENT DOCUMENTS

| | | | |
|---|---|---|---|
| 5,755,913 A | 5/1998 | Liaw et al. | |
| 6,759,481 B2 | 7/2004 | Tong | |
| 6,773,535 B1 | 8/2004 | Wetzel | |
| 6,827,325 B2 | 12/2004 | Hofmann et al. | |
| 6,986,855 B1 | 1/2006 | Hood et al. | |
| 7,188,498 B2 | 3/2007 | Browne et al. | |
| 2001/0047579 A1 | 12/2001 | Lee et al. | |
| 2004/0131823 A1* | 7/2004 | Rodgers et al. | 428/100 |
| 2005/0151385 A1 | 7/2005 | Autumn et al. | |
| 2005/0167556 A1 | 8/2005 | Fontana et al. | |
| 2005/0240190 A1 | 10/2005 | Gall et al. | |
| 2005/0246873 A1* | 11/2005 | Tachauer et al. | 24/451 |
| 2005/0274455 A1 | 12/2005 | Extrand | |
| 2006/0036045 A1 | 2/2006 | Wilson et al. | |
| 2006/0156535 A1* | 7/2006 | Browne et al. | 29/559 |
| 2007/0073130 A1 | 3/2007 | Finch et al. | |

(Continued)

FOREIGN PATENT DOCUMENTS

| | | |
|---|---|---|
| DE | 69931474 | 5/2007 |
| DE | 102006012169 | 9/2007 |
| DE | 102008055870 | 5/2010 |

OTHER PUBLICATIONS

Bellin, I.; Kelch, S.; Langer, R.; Lendlein, A. "Polymeric triple-shape materials." Nov. 20, 2006. PNAS 2006. vol. 103, No. 48. pp. 18043-18047.*

German Office Action dared Jul. 20, 2011; Application SN: G14635PDE-Sh/Sd; Applicant: GM Global Technology Operations LLC; 4 pages.

(Continued)

*Primary Examiner* — Philip Tucker
*Assistant Examiner* — Vicki Wu
(74) *Attorney, Agent, or Firm* — BrooksGroup

(57) ABSTRACT

A polymer material system that consists of multiple layers of polymers of different transition temperatures in a multilayer construction to achieve and tailor a multiple shape memory effect. Wherein two material layers of different transition temperatures are utilized, a triple shape memory effect is achieved. In alternative embodiments, a triple shape memory effect may be achieved wherein each of the two layers are transformable using different external stimulus such as heat, light, magnetism, or moisture.

8 Claims, 4 Drawing Sheets

(56) References Cited

U.S. PATENT DOCUMENTS

| | | |
|---|---|---|
| 2007/0289786 A1 | 12/2007 | Cutkosky et al. |
| 2008/0269420 A1* | 10/2008 | Tong et al. .................... 525/208 |
| 2009/0130391 A1* | 5/2009 | Taya ............................ 428/172 |

OTHER PUBLICATIONS

Nelson et al., Shape Recovery of Nanoscale Imprints in a Thermoset "Shape Memory" Polymer, Applied Physics Letters, 2005, 86, 103108.
Lendlein et al., Shape-Memory Polymers, Angewandte Chem. Int. Ed., 2002, pp. 2034-2057, vol. 41.
Xie et al., Self-Peeling Reversible Dry Adhesive System, Chem. Mater., 2008, pp. 2866-2868, vol. 20.
Liu et al., Chemically Cross-Linked Polycyclooctene: Synthesis, Characterization and Shape Memory Behavior, Macromolecules, 2002. pp. 9868-9874, vol. 35.
Lendlein et al., Biodegradable, Elastic Shape-Memory Polymers for Potential Biomedical Applications, Science, May 31, 2002, pp. 1673-1676, vol. 296.
Lee et al., Structure and Thermomechanical Properties of Polyurethane Block Copolymers with Shape Memory Effect, Macromolecules, 2001, pp. 6431-6437, vol. 34.
Lin et al., Study on Shape-Memory Behavior of Polyether-Based Polyurethanes. I. Influence of the Hard-Segment Content, J. of Applied Polymer Science, 1998, pp. 1563-1574, V.69.
Lin et al., Study on Shape-Memory Behavior of Polyether-Based Polyurethanes. II. Influence of Soft-Segment Molecular Weight, J. of App. Polymer Science, 1998, pp. 1575-1586, 69.
EPON Resin 828 Structural Reference Manual, Shell Chemicals, Houston, TX.
Gall et al., Shape Memory Polymer Nanocomposites, Acta Materialia, 2002, pp. 5115-5126, vol. 50.
Gall et al., Internal Stress Storage in Shape Memory Polymer Nanocomposites, Applied Physics Letter, Jul. 12, 2004, pp. 290-292, vol. 85, No. 2.
Xu et al., Synthesis and Shape Memory Effects of Si-O-Si Cross-Linked Hybrid Polyurethanes, Polymer, 2006, pp. 457-465, vol. 47.
Crystallisation of Liquid DGEBPA and DGEBPF Epoxy Resins, Resolution Performance Products, Product Bulletin, SC:2365-01, Jul. 2001.
Jeffamine D-230 Polyetheramine, Technical Bulletin, Huntsman Corporation, Copyright 2006.
Xie et al., Self-Peeling Reversible Dry Adhesive System, Materials, & Processes Laboratory, General Motors Research & Development Center, Chem. Mater. 2008,vol. 20, pp. 2866-2.
Aubert et al., Thermally Removable Epoxy Adhesives Incorporating Thermally Reversible Diels-Alder Adducts, The Journal of Adhesion, 2003, vol. 79, pp. 609-616.
International Search Report and Written Opinion, International Application No. PCT/US/2008/060796 Filed Apr. 18 2008, Appicant GM Global Technology Operations, Inc.
Unver et al., Geckbot: A Gecko Inspired Climbing Robot Using Elastomer Adhesives.
Daltorio et al., A Small Wall-Walking Robot with Compliant, Adhesive, Feet, IEEE/RSJ International Conference on Intelligent Robots and Systems, 2005, pp. 4018-4023.
International Search Report and Written Opinon, International Application No. PCT/US2008/060826 filed Apr. 18, 2008, Applicant GM Global Technology Operations, Inc.
Lee et al., A Reversible Wet/Dry Adhesive Inspired by Mussels and Geckos, Nature, Jul. 19, 2007, pp. 338-342, vol. 448.
Lee et al., Single-Molecule Mechanics of Mussel Adhesion, PNAS, Aug. 29, 2005, pp. 12999-13--3, vol. 103, No. 35.
Veriflex Shape Memory Polymer, http://www.crgrp.net/veriflex.shtml, Cornerstone Research Group, Inc., 2003-2007.
Shape Memory Polymer, http://crgnp.net/success-stories.shtml, Cornerstone Research Group, Inc., 2003-2007.
TEMBO Shape Memory Polymers and Elastic Memory Composite (EMC) Material, http://www.ctd-materials.com/products/emc.htm, Cornerstone Research Group, Inc., 2003-2007.
Behl et al., Shape-Memory Polymers: Dual Shape Materials for Bio-medical Applications, A. Mater. Today, 2007, vol. 10, pp. 1-20.
Bellin et al., Polymeric Triple-Shape Materials, PNAS, Nov. 28, 2006, vol. 103, No. 48, pp. 18043-18047.
Chung et al., Two-Way Reversible Shape Memory in a Semicrystalline Network, Macromolecules, 2008, vol. 41, pp. 184-192.
Rousseau et al., Shape Memory Effect Exhibited by Smectic-C Liquid Crystalline Elastomers, J. Am. Chem. Soc., 2003, vol. 125, pp. 15300-15301.
Liu et al., Review of Progress in Shape-Memory Polymers, Journal of Materials Chemistry, 2007, vol. 17, pp. 1543-1558.
Dietsch et al., A Review—Features and Benefits of Shape Memory Polymers (SMPs), Journal of Advanced Materials, Apr. 2007, vol. 39, No. 2, pp. 3-12.
Li et al., Shape Memory Effect of Ethylene—Vinyl Acetate Copolymers, Journal of Applied Polymer Science, 1999, vol. 71, pp. 1063-1070.
Liu et al., Novel Shape-Memory Polymer with Two Transition Temperatures, Macromol. Rapid Commun., 2005, vol. 26, pp. 649-652.
Reyntjens et al., Polymer Networks Containign Crystallizable Poly(octadecyl vinyl ether) Segments for Shape-Memory Materials, Macromol. Rapid Commun., 1999, vol. 20,pp. 251-255.
Jiang et al., Polymers Move in Response to Light, Advanced Materials., 2006, vol. 18, pp. 1471-1475.
Huang et al., Water-Driven Programmable Polyurethane Shape Memory Polymer: Demonstration and Mechanism, Applied Physical Letters, 2005, vol. 86, pp. 114105-1--3.
Lendlein et al., Light-Induced Shape-Memory Polymers, Nature, Apr. 14, 2005, vol. 434, pp. 879-882.
Goethals et al., Poly(vinyl ethers) as Building Blocks for New Materials, Macromol. Symp. 1998, vol. 132, pp. 57-64.
Xiao, U.S. Appl. No. 12/273,083, Self-Healing and Scratch Resistant Shape Memory Polymer System, filed Nov. 18, 2008.
Xie, U.S. Appl. No. 11/867,531, Reversible Dry Adhesives, filed Oct. 4, 2007.
Xie, U.S. Appl. No. 12/396,045, Polymer Systems with Multiple Shape Memory Effect, filed Mar. 2, 2009.
Xie, U.S. Appl. No. 12/367,826, A Reversible Welding Process for Polymers, filed Feb. 9, 2009.
Xie, U.S. Appl. No. 12/178,844, High Strength Reversible Noncovalent Adhesion Methods for a Solid Polymer-Polymer Interface, filed Jul. 24, 2008.
Cheng, U.S. Appl. No. 12/359,709, Remote Activation of Thermo-Reversible Dry Adhesives, filed Jan. 26, 2009.
Xie, U.S. Appl. No. 12/423,947, Shape Memory Polymer and Adhesive Combination and Methods of Making and Using the Same, filed Apr. 15, 2009.
Xie, U.S. Appl. No. 12/432,211, Shape Memor Polymers with Surface Having Dangling Adhesive Polymeric Chains and Methods of Making and Using the Same, filed Apr. 29, 2009.
Xie, U.S. Appl. No. 12/181,562, Polymer Systems with Multiple Shape Memory Effect, filed Jul. 29, 2008.
Xie, U.S. Appl. No. 11/867,549, Method of Miniimizing Residue Adhesion for Thermo-Reversible Dry Adhesives, filed Oct. 4, 2007.
Xie, U.S. Appl. No. 12/105,865, Attachment Pad with Thermal Reversible Adhesive and Methods of Making and Using the Same, filed Apr. 18, 2008.
Xie, U.S. Appl. No. 11/867,558, Multilayer Adhesive for Thermal Reversible Joining of Substrates, filed Oct. 4, 2007.
Xie, U.S. Appl. No. 12/391,704, Reversible Dry Adhesives for Wet adn Dry Conditions, filed Feb. 24, 2009.
Xie, U.S. Appl. No. 12/105,749, Method for Robotic Handling Using Thermo-Reversible Dry Adhesives, filed Apr. 18, 2008.
Xie, U.S. Appl. No. 12/105,788, Climbing Devices Based on Thermo-Reversible Dry Adhesives, filed Apr. 18, 2008.
Xie, USSN Oct. 4, 2007, Shape Memory Epoxy Polymers, filed Oct. 4, 2007.

* cited by examiner

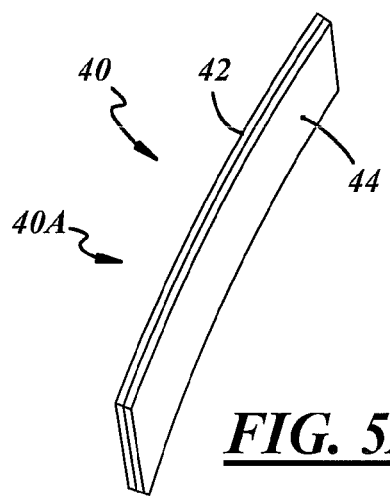 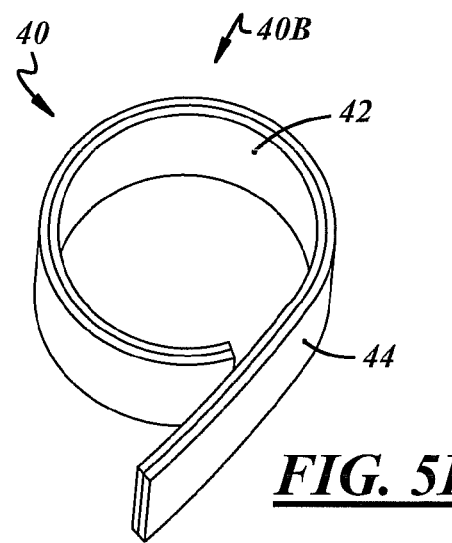 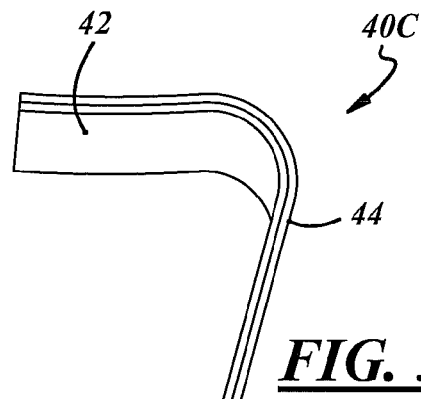 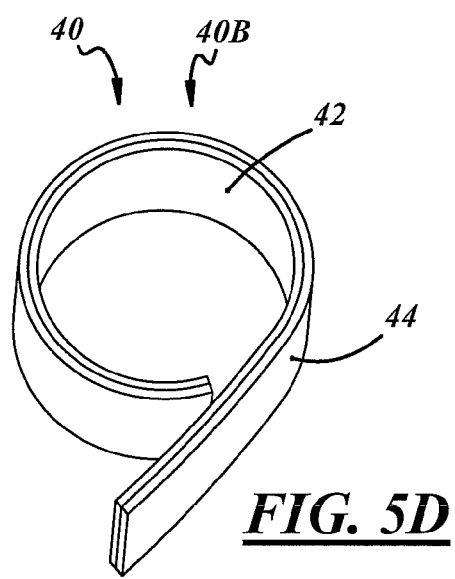 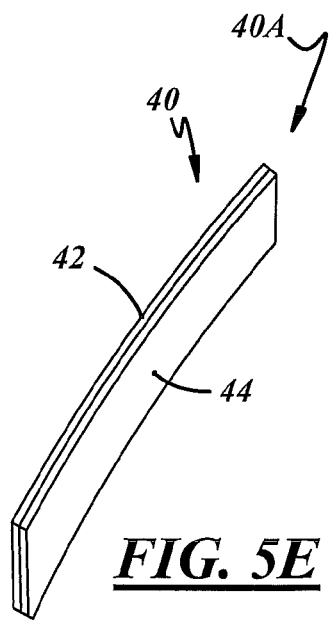
*FIG. 5A* *FIG. 5B* *FIG. 5C* *FIG. 5D* *FIG. 5E*

POLYMER SYSTEMS WITH MULTIPLE SHAPE MEMORY EFFECT

This application is a continuation-in-part of U.S. patent application Ser. No. 12/181,562 filed Jul. 29, 2008.

TECHNICAL FIELD

The field to which the disclosure generally relates includes polymeric materials, and more specifically to a shape memory polymeric material systems that can fix to multiple deformed temporary shapes and recover to their original shape only upon external stimuli.

BACKGROUND

Shape memory polymers (SMPs) represent responsive polymers that can fix to deformed temporary shapes and recover to their permanent (original) shapes only upon external stimuli.

SUMMARY OF EXEMPLARY EMBODIMENTS OF THE INVENTION

One exemplary embodiment may include a polymer material system that may include multiple SMP layers of different shape memory transition temperatures in a multilayer construction to achieve and tailor a multiple shape memory effect.

More specifically, one exemplary embodiment may include separately synthesizing two separate polymers each having a particular and individual dual shape memory effect (DSME). The two materials are then coupled together to form a bi-layer polymeric material that exhibits triple shape memory effect (TSME). The two polymeric materials forming the layers in this exemplary embodiment have well separated thermal transitions, strong interfaces, and an appropriate balance of moduli and weight ratio between the layers to achieve reliable TSME.

In another exemplary embodiment, each of the two separate polymer materials of the bi-layer polymeric material may be separately activated by different external stimuli to achieve TSME. These external stimuli include heat (i.e. temperature), magnetism, light and/or moisture.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein:

FIG. 5A is a schematic perspective view for the bi-layer polymeric material BE3 in its permanent original shape according to one exemplary embodiment;

FIG. 5B is a schematic perspective view of the bi-layer polymeric material BE3 of FIG. 5A transformed from its original permanent shape to a first temporary shape;

FIG. 5C is a schematic perspective view of the bi-layer polymeric material BE3 of FIG. 1A transformed from its first temporary shape to a second temporary shape;

FIG. 5D is a schematic perspective view of the bi-layer polymeric material BE3 of FIG. 5A reverted from its second temporary shape to its first temporary shape; and FIG. 5E is a schematic perspective view of the bi-layer polymeric material BE3 of FIG. 5A reverted from its first temporary shape to its original permanent shape.

DETAILED DESCRIPTION OF EXEMPLARY EMBODIMENTS

The following description of the embodiment(s) is merely exemplary (illustrative) in nature and is in no way intended to limit the invention, its application, or uses.

Figure 1A:
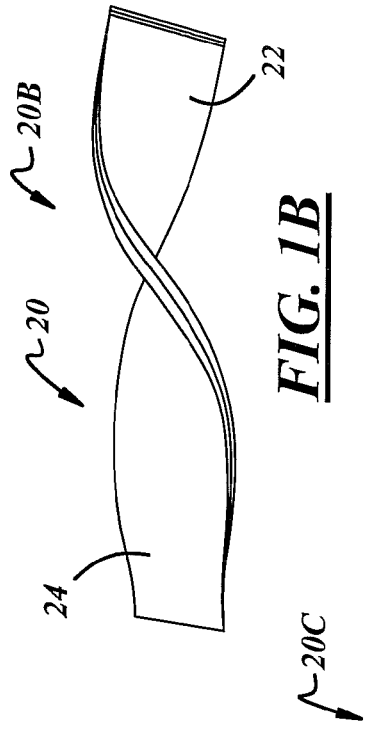
FIG. 1A is a schematic perspective view of a bi-layer polymeric material in accordance with one exemplary embodiment having a triple shape memory effect in its original shape.
Figure 1B:
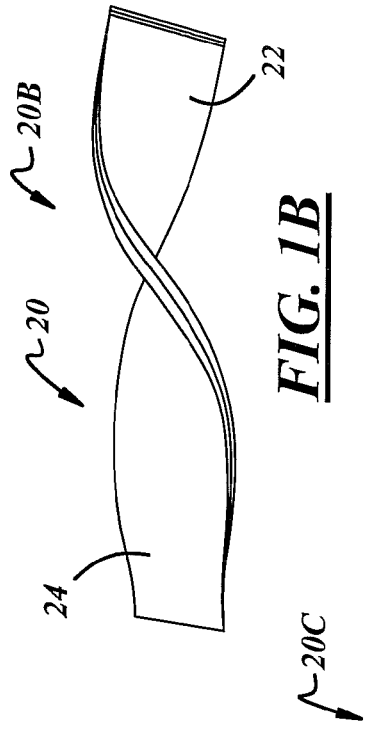
FIG. 1B is a schematic perspective view of the bi-layer polymeric material of FIG. 1A transformed from its original permanent shape to a first temporary shape.
Figure 1C:
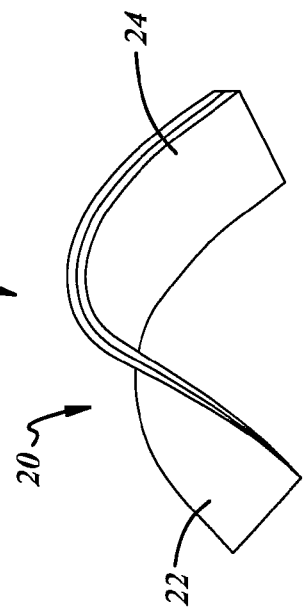
FIG. 1C is a schematic perspective view of the bi-layer polymeric material of FIG. 1A transformed from its first temporary shape to a second temporary shape.

Referring first to FIGS. 1A-1E, a generic version of a bi-layer polymeric material 20 having triple shape memory effect (TSME) is illustrated in its original permanent shape (shown as 20A in FIGS. 1A and 1E), a first temporary shape (shown as 20B in FIGS. 1B and 1D), and a second temporary shape (shown as 20C FIG. 1C). An exemplary embodiment of a bi-layer polymeric material 40 having TSME, designated BE3, will be described in FIGS. 5A-5E below.

The bi-layer polymeric material 20 may include a first material layer 22 coupled to a second material layer 24. In FIG. 1A, the bi-layer polymeric material 20 is shown in its permanent shape 20A. By definition, the permanent original shape 20A is the shape in which the bi-layer polymeric material 20 will remain in the absence of deformation under load and elevated temperatures as described in FIGS. 1B-1D below.

In FIG. 1B, the permanent shape 20A may be heated to a first elevated temperature $T_{high}$ and then deformed under stress to yield a first temporary shape 20B, a shape which may be different in visual appearance from the permanent shape 20A. By definition, the first elevated temperature $T_{high}$ is a temperature sufficiently high to ensure a phase transition for both the first polymeric material layer 22 and the second polymeric material layer 24 (i.e. is a temperature above the glass transition temperature ($T_g$) of the polymer materials in the first polymeric material layer 22 and the second polymeric material layer 24). The bi-layer polymeric material 20 may then be cooled under stress to a mid-level temperature $T_{mid}$, wherein the stress may be relieved to fix the first temporary shape 20B. By definition, the mid-level temperature $T_{mid}$ is a temperature below the glass transition temperature of one of the two polymeric material layers 22 or 24, but above the glass transition temperature of the other of the two polymeric material layers 22 or 24.

Next, as shown in FIG. 1C, the first temporary shape 20B may be deformed under stress at the mid-level temperature $T_{mid}$ to form the second temporary shape 20C. The second temporary shape 20C may then be cooled to a low temperature $T_{low}$ under stress. By definition, the temperature $T_{low}$ is below the glass transition temperature $T_g$ for both of the polymer materials corresponding to polymeric material layers 22 and 24. Next, the stress is removed to yield the second temporary shape 20C.

Figure 1D:
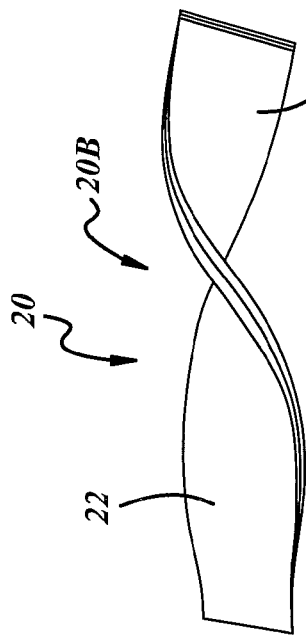
FIG. 1D is a schematic perspective view of the bi-layer polymeric material of FIG. 1A reverted from its second temporary shape to its first temporary shape.
Figure 1E:
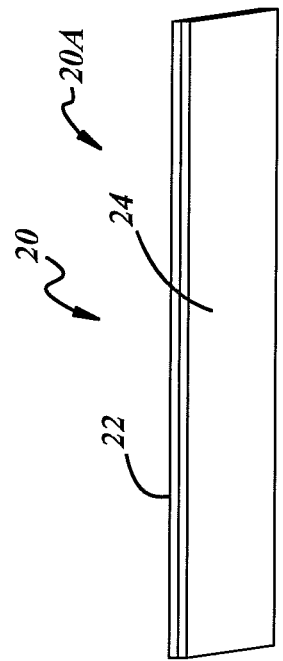
FIG. 1E is a schematic perspective view of the bi-layer polymeric material of FIG. 1A reverted from its first temporary shape to its original permanent shape.

To recover the first temporary shape 20B from the second temporary shape 20C, as shown in FIG. 1D, the bi-layer polymeric material 20 may be reheated from the low temperature $T_{low}$ to the mid-level temperature $T_{mid}$ in the absence of stress.

Finally, to recover the permanent shape 20A from the first temporary shape 20B, as shown in FIG. 1B, the bi-layer polymeric material 20 may be reheated from the mid-level temperature $T_{mid}$ to the first elevated temperature $T_{high}$ in the absence of stress.

In order to achieve TSME as described in FIGS. 1A-1E above, the bi-layer material 20 may include certain formation guidelines.

First, the first material layer 22 and the second material layer 24 may have well separated thermal transitions. Well separated thermal transitions are defined in terms of glass transition temperature $T_g$ and how the bi-layer material 20 can be characterized on a dynamic mechanical analysis curve ("DMA curve"), a characterization that measures the bi-layer material's storage moduli at a given temperature. A well separated thermal transition may be achieved wherein the DMA curve of the bi-layer material 20 has a mid-level plateau in storage modulus between the $T_g$ of the first material layer 22 and the second material layer 24, a higher plateau at a temperature less than the $T_g$ of the first material layer 22 and the second material layer 24, and a lower plateau at a temperature above the $T_g$ of the first material layer 22 and the second material layer 24.

Moreover, the first material layer 22 may experience a strong interface with the second material layer 24 over the wide ranges of temperatures in which the bi-layer material 20 is utilized, including specifically the temperatures at which the bi-layer material 20 may be transformed between its permanent shape 20A, its first temporary shape 20B, and its second temporary shape 20C as will be described further below. In other words, the first material layer 22 and second material layer 24 may be strongly bonded to each other to prevent delamination regardless of whether the bi-layer material 20 is in its permanent shape 20A, its first temporary shape 20B, or its second temporary shape 20C. This strong interface may be the result of numerous adhesion phenomenon between two surfaces known to those of ordinary skill in the adhesion art, including but not limited to covalent bonding, non-covalent bonding, and mechanical adhesion that may occur when the first material layer 22 is coupled to the second material layer 24.

Further, the first polymeric material layer 22 and second polymeric material 24 may have an appropriate balance of moduli and weight ratio between the layers 22, 24 to achieve optimized TSME.

In theory, many polymeric materials may be used in the formulations of the bi-layer polymeric materials 20.

In one exemplary embodiment, a rigid aromatic diepoxide (EPON 826), a flexible aliphatic diepoxide (NGDE), and an aliphatic diamine (Jeffamine D-230) may be used to formulate epoxy thermosetting bi-layer polymeric materials 20 that function as shape memory polymers (SMP's). One exemplary embodiment of the formulations is included in the Experimental Section described below. Moreover, one specific exemplary embodiment, BE3, will be illustrated in its permanent shape and temporary shapes below in FIGS. 4B and 5A-5E.

By varying the ratio between EPON 826 and NGDE, two epoxy dual shape SMP's, for use in the first polymeric material layer and second polymeric material layer respectively, that differ in the overall molecular rigidity were synthesized. These two epoxy SMP polymers (labeled as L and H) possess glass transition temperatures ($T_g$'s) of 38 and 75 degrees Celsius, respectively (based on their storage moduli in the DMA curves). Here, the sample designations L and H indicate their low and high $T_g$'s on a relative basis.

Figure 2A:
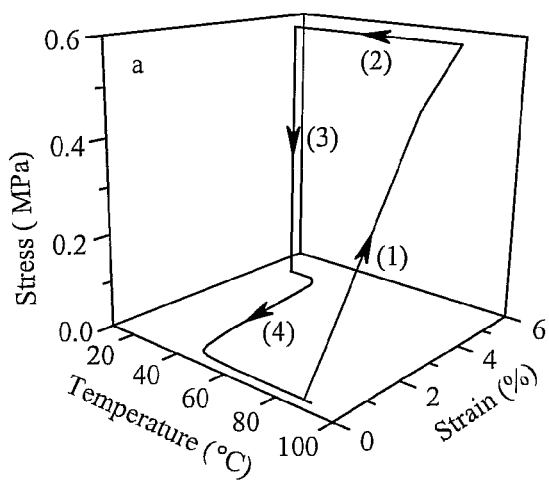
FIG. 2A illustrates a dual-shape memory cycle graph for epoxy SMP polymer L according to an exemplary embodiment.
Figure 2B:
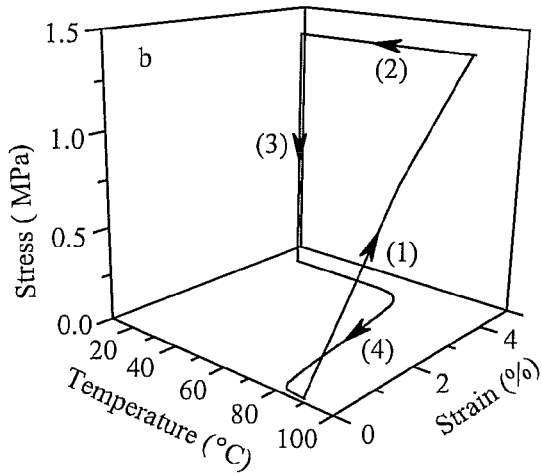
FIG. 2B illustrates a dual-shape memory cycle graph for epoxy SMP polymer H according to an exemplary embodiment.

Referring now to FIGS. 2A and 2B, the dual-shape memory cycles for polymers L and H are each individually illustrated. In these Figures, the polymers were formed to a specific shape (i.e. in their permanent shapes) at ambient temperatures and without load (i.e. stress). The polymers were then heated to a temperature above their respective glass transition temperature under increasing stress until a desired strain was achieved (as shown along line (1)) to change the shape of the polymer from its original permanent shape to a temporary shape. The original permanent shape is the shape of the polymeric material while exhibiting no strain (regardless of temperature or stress applied thereto); while the temporary shape is a shape that exhibits elevated strain as compared to the original shape (regardless of temperature or stress applied thereto).

The polymers were then cooled to a temperature below their respective glass transition temperature while maintaining their respective stress (as shown along line (2)). Next, the stress was relieved on the respective polymer, as shown along line (3), without a reduction in strain, thus confirming that the polymer remained in its temporary shape. Finally, the polymer was heated back to a temperature above its glass transition temperature in the absence of stress, as shown along line (4). The polymer reverted back to its original shape, as confirmed wherein the strain on the polymer reverted to 0% strain. Thus, FIGS. 2A and 2B confirm that both polymer L and H each display dual-shape memory properties with shape fixities and recovery around 100%.

Figure 3A:
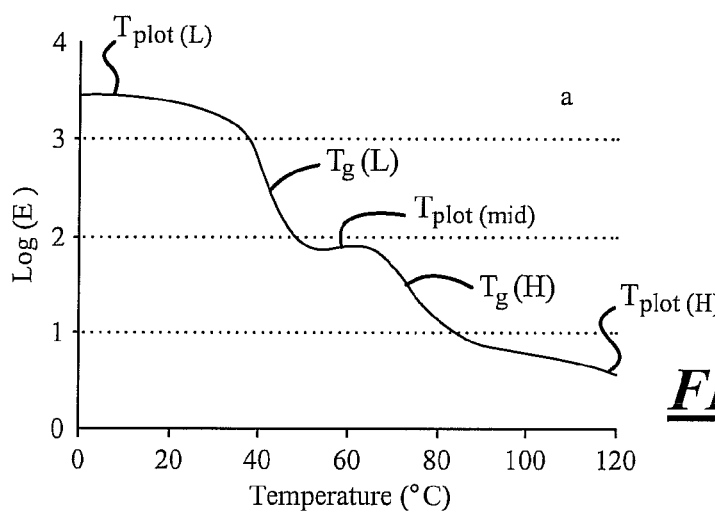
FIG. 3A illustrates a dynamic mechanical analysis curve for bi-layer polymer material BE2 according to an exemplary embodiment.
Figure 3B:
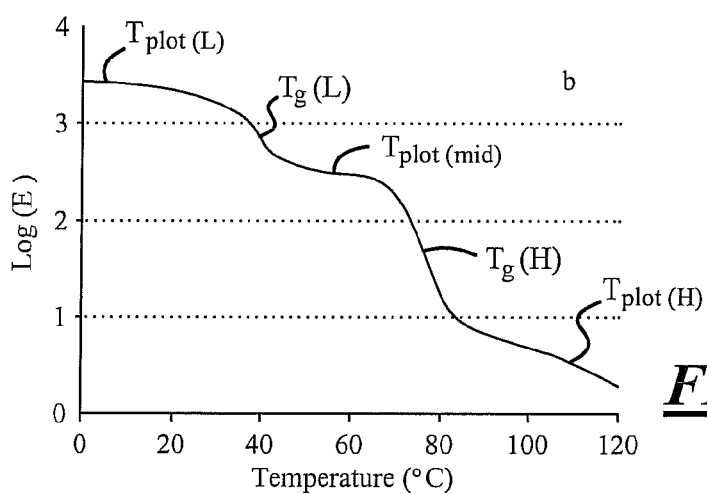
FIG. 3B illustrates a dynamic mechanical analysis curve for bi-layer polymer material BE3 according to another exemplary embodiment.

Accordingly, four bi-layer epoxy polymers (labeled BE1, BE2, BE3 and BE4 respectively) consisting of polymer L layer and polymer H layer at different weight ratios (shown in Table 1) were synthesized using a two-step curing process. The DMA curve for BE2 (FIG. 3A) shows two glass transitions ($T_g(L)$ and $T_g(H)$) corresponding to epoxy L and H, respectively. These two glass transitions are well-separated, which results in a plateau in storage modulus ($T_{plat}(Mid)$) between 50 and 65 degrees Celsius, in addition to the two plateaus ($T_{plat}(L)$ and $T_{plat}(H)$) below the Tg of epoxy L and above the Tg of epoxy H. The DMA curves for BE3 (FIG.

3B), BE1, and BE4 (not shown) display similar features except that their respective storage moduli corresponding to the mid-plateau varies depending on the weight ratios between L and H in the samples.

TABLE 1

Summary of the triple-shape memory properties.

| Sample ID | Weight ratio (L/H) | $R_f(A \rightarrow B)$ (%) | $R_f(B \rightarrow C)$ (%) | $R_r(C \rightarrow B)$ (%) | $R_r(B \rightarrow A)$ (%) |
|---|---|---|---|---|---|
| BE1 | 2.78 | 76.4 | 96.4 | 91.5 | 99.0 |
| BE2 | 2.61 | 78.2 | 93.8 | 98.3 | 100.0 |
| BE3 | 1.27 | 95.6 | 83.3 | 92.8 | 103.6 |
| BE4 | 0.44 | 97.4 | 71.4 | 92.5 | 98.7 |
| H | 0 | — | 100.0 | — | 98.6 |
| L | ∞ | 100.0 | — | 100.8 | — |

Figure 4A:
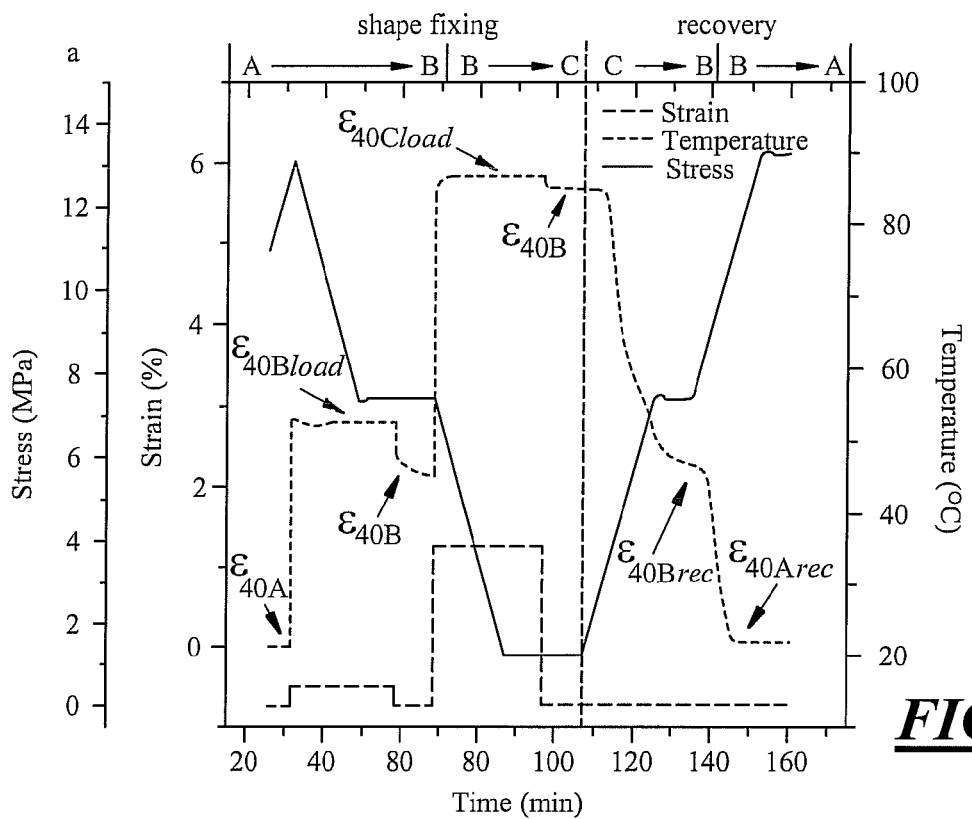
FIG. 4A illustrates a graphical analysis of a triple-shape memory cycle for the bi-layer polymer material BE2 according to one exemplary embodiment.

The triple-shape memory cycle for BE2 is illustrated in FIG. 4A. In the two-step shape fixing process, the permanent shape A was first heated to $T_{high}$ (about 90 degrees Celsius, which is above the $T_g$ of epoxy H) and deformed. Cooling under the stress to $T_{mid}$ (about 56 degrees Celsius, which falls in the middle of the mid-plateau in the DMA curve) and releasing the stress fixed temporary shape B, corresponding to $\epsilon_B$. In the second fixing step, shape B was further deformed under a larger stress and cooled down to $T_{low}$ (about 20 degrees Celsius). Releasing the stress after cooling led to temporary shape C ($\epsilon_c$). Here, the glassification of epoxy H at $T_{mid}$ and L at $T_{low}$ was responsible for fixing shapes B and C, respectively. For recovery, shape C was heated to $T_{mid}$, yielding the recovered shape B ($\epsilon_{Brec}$). The recovered shape B remained stable until the temperature was further increased to $T_{high}$, leading to the recovered shape A ($\epsilon_{Arec}$). Under the identical thermomechanical conditions, the triple-shape memory cycle was repeated two more times using the same sample and no noticeable difference was observed in the shape memory curves.

Figure 4B:
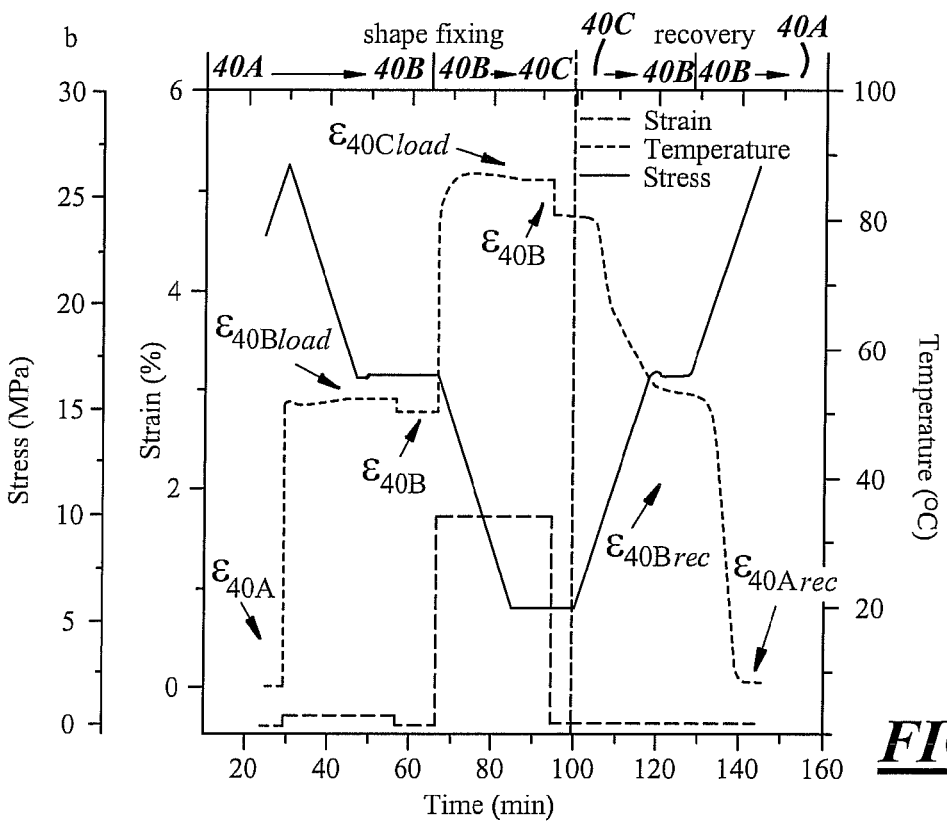
FIG. 4B illustrates a graphical analysis of a triple-shape memory cycle for the bi-layer polymer material BE3 according to one exemplary embodiment.

Qualitatively, the bi-layer samples BE1, BE3, and BE4 also show triple-shape memory capability. For comparison, the triple-shape memory cycle for BE3 is displayed graphically in FIG. 4B and illustrated below in FIGS. 5A-5E. A notable difference between FIG. 4A and FIG. 4B is that a much smaller stress was used to deform and fix shape C (shown as 40C in FIG. 5C) for BE3, which was attributed to its lower storage modulus at $T_{mid}$ than that of BE2. The quantitative triple-shape memory properties (shape fixity $R_f$ and shape recovery $R_r$) for all the bi-layer polymer systems are summarized in Table 1 above. Data in this table shows that $R_f(A \rightarrow B)$ increases as the weight ratio of the epoxy L and the epoxy H decreases (from BE1 to BE4, in that particular order), while $R_f(B \rightarrow C)$ follows an opposite trend. Such trends can be readily explained by a mechanism that can be viewed as an "arm-wrestling" contest between L and H. At the first stage of shape fixing (A→B) at $T_{mid}$, the fixing relies on the freezing of molecular mobility of the H layer while the L layer tends to retain its original shape and thus disfavors the shape fixing of the bi-layer polymers. The situation reverses at the second stage of the shape fixing (B→C) that occurs at $T_{low}$, i.e., the fixing relies on the L layer, while the layer H has a tendency to keep shape B. Overall, the shape fixities of the bi-layer polymers are determined by the weight ratio between the two layers and their moduli at the corresponding shape fixing temperatures. In terms of shape recovery, all $R_c$ values in Table 1 are higher than 91%, indicating that they recover well in all cases.

The TSME associated with the bi-layer polymer systems BE1, BE2, BE3 and BE4 benefited from the strong interface between the two epoxy layers. The unreacted epoxy groups or amine groups on the surface of the first cured epoxy layer (for polymer L) continued to react with the second epoxy liquid (for polymer H) poured onto it, producing a strong interface. Without the strong interface, the bi-layer polymer synthesis BE1, BE2, BE3, or BE4 may not have exhibited TSME, instead, delamination may have occurred during the shape memory cycles. In principle, the general approach of achieving TSME with bi-layer construction can be extended into any combination of two DSMP's, provided that the interface between the first material layer and the second material layer is strong enough. Due to the versatility of the material design, achieving multiple-shape memory effect beyond triple-shape is possible with material constructions consisting of more than two layers.

Experimental Materials

The diglycidyl ether bisphenol A epoxy monomer (EPON 826) and the poly(propylene glycol)bis(2-aminopropyl) ether curing agent (Jeffamine D-230) were obtained from Hexion and Huntsman, respectively. Neopentyl glycol diglycidyl ether (NGDE) was purchased from TCI America. All chemicals were used as received.

Synthesis of Epoxy Polymer H and L

EPON 826 was first melted at 75 degrees Celsius for 15 minutes. It was then mixed with NGDE and Jeffamine D-230 at a mole ratio of 1.6/0.4/1. The mixture was poured into an aluminum mold, cured at 100 degrees Celsius for 1 h, and postcured at 130 degrees Celsius for 1 hour to produce the epoxy polymer H. The cured epoxy was demolded and cut into desirable sizes prior to testing. Epoxy polymer L was produced in the same fashion except that the mole ratio of EPON 826/NGDE/Jeffamine D-230 was 0.8/1.2/1.

Synthesis of Epoxy Bilayer Polymer Samples

The epoxy liquid mixture corresponding to epoxy polymer H was cured in an aluminum mold at 100 degrees Celsius for 40 minutes to produce the first epoxy layer. The epoxy liquid mixture corresponding to epoxy polymer L was poured on top of the cured first epoxy layer, cured at 100 degrees Celsius for 40 minutes, and postcured at 130 degrees Celsius for 1 hour. Following this two step curing process, four bilayer epoxy polymer samples (namely, polymer material systems BE1, BE2, BE3 and BE4) were produced by varying the weight ratio between the two epoxy liquids. Specifically, the weight ratios between polymer L and polymer H in BE1, BE2, BE3, and BE4 are 2.78, 2.61, 1.27, and 0.44, respectively.

Thermomechanical Characterization

The dynamic mechanical analysis (DMA) experiments were performed in a dual cantilever mode using a DMA Q800 (TA instruments) and the testing parameters were: constant frequency=1 Hz; oscillation amplitude=30 μm; heating rate=1 degree Celsius/minute.

Shape Memory Cycles

All quantitative shape memory cycles were obtained using a DMA 2980 in a three point bending mode. The analysis was conducted under a static force mode and the heating and cooling rates were 1 degrees Celsius/minute.

For visual demonstration of the TSME, as shown in FIGS. 5A-5E, BE3 (shown as 40 in FIGS. 5A-5E that includes polymer layer L (shown as 42 in FIGS. 5A-5E) coupled to polymer layer H (shown as 44 in FIGS. 5A-5E) with a rectangular shape (shape 40A as shown in FIG. 5A) was heated in an oven preset at 90 degrees Celsius for 10 minutes. It was then deformed manually after it was taken out of the oven and immediately immersed into a hot water bath preset at 56.0±0.5 degrees Celsius for 1 minute. This yielded the first temporary shape 40B as shown in FIG. 5B. Shape 40B was immersed in the water bath for another 1 minute. Afterwards, it was taken out of the bath again, immediately deformed, and cooled down to 22 degrees Celsius to fix the second temporary shape 40C, as shown in FIG. 5C. For recovery, second temporary shape 40C was put back into the water bath (56.0±0.5 degrees Celsius) for 1 minute, which changed to shape 40B as shown in FIG. 5D. Recovery of permanent shape 40A was performed by heating temporary shape 40B to 90 degrees Celsius for 5 minutes, as shown in FIG. 5E.

While one exemplary embodiment illustrates epoxy thermosetting polymers utilizing a specific subset of epoxies and amines are used for use both in the first polymeric material layer 42 and the second polymeric material layer 44, other polymeric systems may be utilized. For example, the polymeric composition of the first polymeric layer and second polymeric layer may be formed from differing polymeric backbone materials and/or crosslinking systems, so long as they form a multi-layer material that exhibits TSME effect and meets the formation guidelines described above in terms of a strong interface between layers, well separated thermal transitions, and an appropriate balance of moduli and weight ratio to prevent delamination as the bi-layer material is transformed from its permanent state to its multiple temporary shapes under appropriate heat and stress. Thus, for example, polymeric materials systems other than epoxy/amine systems may be used in one or both of the layers.

Polymeric systems with triple-shape functionality may enable application is various fields because their properties can be adjusted over a wide range. Thus, potential applications for triple-shape memory polymers can exist in many different technologies. For example, triple-shape memory polymers may be useful in automotive applications such as self-repairing autobodies, in medical applications such as for use in degradable medical implants, for electrical applications such as for use in switches or sensors, for common applications such as use in utensils or other tools, or other applications not specifically described herein.

While the exemplary embodiments described above bi-layer polymeric materials 20 that exhibit TSME in response to one external stimuli, namely temperature, other exemplary embodiments may be described in which two different external stimuli may be utilized.

In these exemplary embodiments, which may also be shown generally in FIGS. 5A-5E, the bi-layer polymeric material 40 may include a first material layer 42, which is responsive to one type of external stimuli, coupled to a second material layer 44, which is responsive to another type of external stimuli.

Examples of the types of external stimuli that may be utilized in the exemplary embodiments include, but are not limited to temperature, magnetism, light, and moisture.

FIGS. 5A-5E may thus also illustrate the bi-layer polymeric material 40 transitioning between its original permanent shape 40A, and two temporary shapes (40B and 40C) under two different stimuli.

In FIG. 5A, the bi-layer polymeric material 40 is shown in its permanent shape 40A. By definition, the permanent original shape 40A is the shape in which the bi-layer polymeric material 40 will remain in the absence of deformation under load with either a first type of external stimuli or a second type of external stimuli.

The permanent shape 40A may be deformed under stress in the presence of a first external stimulus to yield a first temporary shape 40B, as shown in FIG. 5B, which has a different visual appearance than the permanent shape 40A. The external stimulus may then be removed wherein the stress may be relieved to fix the first temporary shape 40B.

To form the second temporary shape 40C from the first temporary shape 40B, as shown transitioning from FIG. 5B to FIG. 5C, the first temporary shape 40B may be deformed under stress in the presence of a second external stimulus different than the first external stimulus, which has a different visual appearance than the permanent shape 40A and the first temporary shape 40B. The second external stimulus may then be removed wherein the stress may be relieved to fix the second temporary shape 40C.

To recover the first temporary shape 40B from the second temporary shape 40C, the second external stimulus may be reintroduced to the bi-layer material 120 in the absence of stress (FIG. 5D). To recover the permanent shape 40A from the first temporary shape 40B, the first external stimulus may be reintroduced to the bi-layer material 40 in the absence of stress (FIG. 5E).

While the permanent shape 40A and temporary shapes 40B-E are illustrated in particular shapes, it should be understood by those of ordinary skill that the shapes illustrated are not limiting. In other words, the shapes 40A-C as shown are merely illustrative of the principle of changing shapes in response to external stimuli, and are not meant to indicate the actual original permanent shape 40A-C that may occur.

In another exemplary embodiment, one or more additional material layers (not shown) may be coupled to the bi-layer polymeric material to form a multi-layer polymeric material in which at least two of the at least three material layers respond to different external stimuli to transform the multi-layer between a permanent shape and numerous possible temporary shapes.

The above description of embodiments of the invention is merely exemplary in nature and, thus, variations thereof are not to be regarded as a departure from the spirit and scope of the invention.

What is claimed is:

1. A method for forming a polymer system having at least a triple shape memory effect, the method comprising:
   selecting a first polymeric material responsive to a first external stimulus having a first glass transition temperature;
   selecting a second polymeric material having a second glass transition temperature, wherein said second polymeric material is responsive to a second external stimulus, said second external stimulus is different than said first external stimulus,
   forming a first polymeric material layer from said first polymeric material having a desired thickness and a desired modulus;
   forming a second polymeric material layer from said second polymeric material having a desired thickness and a desired modulus;
   coupling said first polymeric material layer to said second polymeric material layer to allow covalent bonding between said first and second polymeric materials to form a bi-layer polymeric material with a strong interface, wherein said first glass transition temperature and said second glass transition temperature are well separated such that the dynamic mechanical analysis curve of said bi-layer polymeric material has a mid-level plateau in storage modulus between the first and second glass transition temperatures, and said bi-layer polymeric material is capable of being transformed between an original permanent shape, a first temporary shape, and a second temporary shape without delamination between said first polymeric material layer and said second polymeric material by application of said first external stimulus or by application of said second external stimulus and wherein said original permanent shape exhibits no strain.

2. The method of claim 1, further comprising transforming said bi-layer polymeric material from said original shape to said first temporary shape by:

applying said first external stimulus to said bi-layer polymeric material and deforming said bi-layer polymeric material under a first stress from said original permanent shape to said first temporary shape; and removing said first external stimuli while maintaining said bi-layer polymeric material under said first stress.

3. The method of claim 2, further comprising transforming said bi-layer polymeric material from said first temporary shape to said second temporary shape by:

applying said second external stimulus to said bi-layer polymeric material under a second stress to transform said bi-layer polymeric material from said first temporary shape to said second temporary shape; and removing said second external stimulus while maintaining said bi-layer polymeric material under said first stress.

4. The method of claim 3 further comprising:

applying said first external stimulus in the absence of stress to recover said bi-layer polymeric material from said second one of said at least two temporary shapes to said first one of said at least two temporary shapes.

5. The method of claim 4 further comprising:

applying said second external stimulus in the absence of stress to recover said bi-layer polymeric material from said first one of said at least two temporary shapes to said original shapes.

6. The method of claim 2, wherein said first external stimulus comprises at least one of the group of temperature, magnetism, light or moisture, and said thickness and modulus of said first and second polymeric material layers are configured to provide shape fixities of at least 76% and shape recovery of at least 91% for said first temporary shape and second temporary shape.

7. The method of claim 3, wherein said second external stimulus comprises at least one of the group of temperature, magnetism, light or moisture.

8. The method of claim 1, wherein at least one of said first polymeric material layer and said second polymer material layer comprises an epoxy thermosetting polymeric material.

* * * * *